United States Patent [19]

Taylor et al.

[11] 4,404,357

[45] Sep. 13, 1983

[54] HIGH TEMPERATURE NAPHTHOL NOVOLAK RESIN

[75] Inventors: Paul Taylor, No. Andover; Michael Gulla, Sherborn, both of Mass.

[73] Assignee: Shipley Company Inc., Newton, Mass.

[21] Appl. No.: 374,054

[22] Filed: May 3, 1982

[51] Int. Cl.$^3$ ............................................. C08G 8/24
[52] U.S. Cl. ................................. 528/153; 528/155; 528/163
[58] Field of Search ....................... 528/153, 163, 155

[56] References Cited

U.S. PATENT DOCUMENTS

| | | | |
|---|---|---|---|
| 2,537,138 | 1/1951 | Jennings | 528/153 X |
| 2,703,792 | 3/1955 | Kropa et al. | 528/163 X |
| 2,927,096 | 3/1960 | Soloway | 528/153 |
| 3,111,448 | 11/1963 | Tawney | 528/153 X |
| 3,290,271 | 12/1966 | O'Brochta | 528/139 X |
| 3,345,249 | 10/1967 | Stephan | 528/153 X |
| 3,957,680 | 5/1976 | Fujii et al. | 528/153 X |
| 4,022,755 | 5/1977 | Tanigaichi et al. | 528/165 X |

OTHER PUBLICATIONS

Walker, Formaldehyde, 3rd Ed. (1964), p. 332.
Berichte, Band III, vol. 40, 1907, p. 3787, Breslauer et al.
Gazzetta Chimicha. Italiana, 67, 1937, Castiglione, pp. 324–326.
Granger, Industrial & Engineering Chemistry, 29(11), pp. 1305–1308 (1937).

*Primary Examiner*—Howard E. Schain

[57] ABSTRACT

Novel resins are disclosed that are the reaction products of an aldehyde and an aromatic alcohol mixture of naphthol, preferably 1-naphthol, and a phenol. The molar ratio of the naphthol to the phenol in the reaction mixture can vary from about 20 to 1 to 1 to 20. The resins are formed by condensing the aldehyde with the aromatic alcohol mixture in the presence of an acid catalyst where the molar ratio of the aromatic alcohol to aldehyde is less than 1. The resins of the invention are characterized by melt temperature higher than the melt temperatures of conventional novolak resins.

10 Claims, No Drawings

HIGH TEMPERATURE NAPHTHOL NOVOLAK RESIN

BACKGROUND OF THE INVENTION

1. Introduction

This invention relates to novel resins that are acid catalyzed reaction products of an aldehyde and an aromatic alcohol mixture consisting of a naphthol and a phenol.

2. Description of the Prior Art

The formation of phenolic resins by the condensation of a phenol with an aldehyde is well known in the art and described in numerous publications including Kirk-Othmer, *Encyclopedia of Chemical Technology*, Volume 15, pages 176 to 208, 1968, incorporated herein by reference. Phenol itself is the phenol used in the greatest volume for the formation of phenolic resins, but resorcinol, alkyl substituted phenols such as cresols, xylenols and p-tert-butylphenol and p-phenylphenol are also used in substantial volume. The aldehyde used is almost exclusively formaldehyde but small amounts of acetaldehyde and furfuraldehyde are also used.

The condensation of a phenol with an aldehyde can be an acid catalyzed reaction with a molar ratio of phenol to aldehyde less than 1 or an alkaline catalyzed reaction with a molar ratio of phenol to aldehyde greater than 1. The acid catalyzed reaction yields thermoplastic resins which have come to be known as the novolak resins while the alkaline catalyzed reaction yields thermosetting resins known as resole resins.

The novolak resins have many commercial uses. Their primary use is as a molding compound where they are molded to a desired configuration and then cured by cross-linking with a cross-linking agent such as hexamethylenetetramine. Another use of the novolak resins is as a film-forming material. For this use, the resin is applied from solution and usually is not cured following film formation.

Novolak resins, prior to cure, have moderate thermal stability and melt within a range of from about 90° C. to 120° C., dependent upon the composition of the resin and its molecular weight. There has been little effort to increase the thermal stability of the thermoplastic novolak resins because high thermal stability has not been considered to be an important property for a film-forming resin.

SUMMARY OF THE INVENTION

The subject invention is directed to a thermoplastic resin formed from a naphthol and a phenol and characterized by a melt temperature and resistance to flow at elevated temperature greater than that of the novolak resins. The resin is a copolymer formed by the condensation of an aldehyde with an aromatic alcohol mixture comprising a naphthol and a phenol in the presence of an acid catalyst. The molar ratio of the naphthol to the phenol may vary from about 20 to 1 to 1 to 20, dependent upon the desired properties of the resin. The resulting resins are especially useful as film formers where resistance to flow at elevated temperatures is a desired property.

DESCRIPTION OF THE PREFERRED EMBODIMENTS

As aforesaid, the resins of this invention are acid catalyzed condensation products of a mixture of aromatic alcohols and an aldehyde. The aromatic alcohol mixture comprises a naphthol and a phenol where the conentration of the naphthol relative to the phenol can vary within wide limits, dependent upon the desired properties of the copolymer. Higher concentrations of the naphthol yield copolymers with higher melt temperatures. In general, polymers can be formed with the naphthol ranging between 5 and 95 mole percent of the aromatic alcohol mixture with the phenol comprising the balance. The preferred concentration of the naphthol, for purposes of this invention, ranges between about 5 and 50 mole percent of the alcohol mixture, and more preferably, between about 8 and 35 mole percent.

The resins are formed by condensing the aromatic alcohol mixture with the aldehyde in the presence of a conventional acid catalyst. The concentration of the alcohol is slightly in excess of the aldehyde and, preferably, the molar ratio of the alcohol to the aldehyde is about 1 to 0.9. The copolymers are formed by mixing the reactants in a reactor and refluxing the mixture at an elevated temperature for a period of time sufficient to form a copolymer of suitable molecular weight. In this respect, the copolymers of the invention typically have a molecular weight ranging between about 500 and 10,000.

The naphthol used in accordance with the invention conforms to the following general formula:

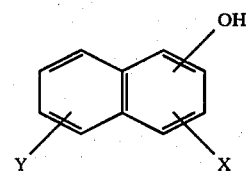

where X and Y are each members selected from the group of hydrogen, lower alkyl having from 1 to 4 carbon atoms, halogen, hydroxyl or carboxyl. Preferably, each of X and Y is hydrogen. The hydroxyl group is in the 1 or 2 position, though 1-naphthols are preferred as the reaction proceeds with greater ease yielding higher molecular weight polymers. The 2-naphthols may gel if the reaction is not carefully controlled.

The phenol used in combination with the naphthol is any of the phenols known to be useful in the formation of a novolak resin. Such materials include, by way of illustration only, phenol itself, m-cresol, o-cresol, p-cresol, 2,4-xylenol, 2,5-xylenol, 3,4-xylenol, 3,5-xylenol, thymol, carvacrol, p-phenylphenol, and p-tert-butyl phenol. The phenol can also comprise a mixture of phenols.

The catalyst used to effect the condensation reaction may be selected from among the mineral acids or organic carboxylic acids known to be useful for the formation of novolak resins. Typical catalysts for this purpose are oxalic acid, hydrochloric acid, p-toluene sulfonic acid, and the like. Oxalic acid is preferred. The amount of catalyst employed may range from 0.5 to 5 percent, by weight, based upon the weight of the total aromatic compounds present in the composition.

Condensation of the aromatic alcohol mixture with the aldehyde may be effected in any conventional condensation apparatus, a reactor equipped with an agitator, means for reflux and distillation and conventional heat-transfer means being useful for performing the reaction. In general, a preferred method for carrying out the condensation reaction is to add the condensation agent (the aldehyde) to the mixture of the aromatic alcohols containing the acid catalyst. The resultant mixture is agitated and heated to reflux over a time period ranging from about 2 to 24 hours during which the aromatic alcohol and the aldehyde condense. The condensation reaction typically involves the formation of low molecular weight intermediates which initially form and then rearrange and combine with each other at a later stage.

Following reflux, excess water is removed from the condensate and the residue vacuum distilled to complete the condensation reaction, thereby removing excess monomer while gradually heating to a temperature ranging from 200° C. to 300° C. Finally, the resultant resin is cooled to room temperature after being removed from the reactor.

Examples of the present invention are set forth below. It will be understood that these examples are for purposes of illustration only and are not to be construed as limiting the invention.

EXAMPLE 1

A copolymer was prepared by reacting an aromatic alcohol mixture comprising 52.08 grams of m-cresol, 280.1 grams of o-cresol and 73.4 grams of 1-naphthol with 287.42 grams of a 34 percent formaldehyde solution in the presence of 7 grams of oxalic acid. The components were added to a reactor under a nitrogen purge, agitated, brought to reflux temperature and refluxed for a period of approximately 6½ hours at a temperature averaging about 90° C. Following reflux, excess water was removed from the condensation product by distillation, and the condensate heated to a temperature of about 200° C. under vacuum distillation for about 4 hours to complete the condensation reaction and remove unreacted monomers. The condensate was then removed from the reaction vessel and permitted to cool to room temperature. The polymer so formed had a melting point of about 114° C. and an average molecular weight of 3000.

The melt point for the above example, and for determining the melt points recited throughout this specification, was determined on a "hot bench" or "hot bar" apparatus. The apparatus consists of a stainless steel bar heated at one end to produce a temperature gradient along the length of the bar. A movable thermocouple provides the temperature along any point on the bar. Melt point is determined by spreading powdered resin along the heated bar. The temperature, considered the melt temperature, is recorded at the point on the bar where a powder/melt interface is observed.

EXAMPLE 2

The procedure of Example 1 was repeated by an aromatic alcohol comprising 212.2 grams of m-cresol and 76.4 grams of 1-naphthol was reacted with 196.4 grams of formaldehyde in the presence of 4.8 grams of oxalic acid. The reaction was continued for about 7 hours and the melting point of the final polymer was found to vary between about 155° and 160° C.

EXAMPLE 3

The procedure of Example 1 was repeated but the reaction mixture comprised an aromatic alcohol which was a mixture of 159.6 grams of m-cresol, 17 grams of 4-tert-butyl phenol and 97.9 grams of 1-naphthol. The aromatic alcohol was reacted with 171 grams of formaldehyde in the presence of 3 grams of oxalic acid. The reaction was continued for a period of about 12½ hours and the melt point of the resulting polymer was found to be 150° C.

EXAMPLE 4

A copolymer was prepared by reacting a mixture of aromatic alcohols which comprised 183.6 grams of m-cresol and 61.2 grams of 2-naphthol with 155.2 grams of formaldehyde in the presence of 4 grams of oxalic acid as catalyst. The reaction was continued for 4 hours at a reflux temperature of 96° to 98° C. followed by distillation to remove excess water. The maximum reaction temperature was 250° C. The resin was removed from the reactor after a total time of one hour above 200° C. A solid resin was obtained that melted at a temperature of about 155° C.

We claim:

1. A resin comprising the product resulting from the condensation of an aldehyde and an aromatic alcohol mixture in the presence of an acid catalyst, said aromatic alcohol mixture comprising from 5 to 95 mole percent of a naphthol and from 95 to 5 mole percent of a phenol that is not a naphthol, said aromatic alcohol mixture being in molar excess of said aldehyde.

2. The resin of claim 1 where the naphthol is a 1-naphthol.

3. The resin of claim 2 where the naphthol comprises from 5 to 50 mole percent and the phenol comprises the balance.

4. The resin of claim 2 where the 1-naphthol comprises from 8 to 35 mole percent and the phenol comprises the balance.

5. The resin of claim 2 where the naphthol is an unsubstituted naphthol.

6. The resin of claim 2 where the naphthol is substituted with a member selected from the group of halo, alkyl having from 1 to 4 carbon atoms, hydroxyl and carboxyl.

7. The resin of claim 2 where the phenol is selected from the group of phenol, m-cresol, p-cresol, 2,4-xylenol, o-cresol 2,5-xylenol, 3,4-xylenol, 3,5-xylenol, thymol, carvacrol, p-phenylphenol, p-tert-butylphenol and mixtures thereof.

8. The resin of claim 7 where the phenol is a cresol.

9. The resin of claim 7 where the phenol is a mixture of a cresol and p-tert-butyl phenol.

10. The resin of claim 2 where the panel is unsubstituted phenol.

* * * * *